US008412568B2

(12) United States Patent  (10) Patent No.: US 8,412,568 B2
Bastos et al.  (45) Date of Patent: Apr. 2, 2013

(54) COLLECTING MEDIA DATA DESCRIPTIVE OF A PRODUCT

(75) Inventors: Guilherme Bastos, Sunnyvale, CA (US); Narasimhan Rampalli, Los Altos, CA (US)

(73) Assignee: eBay, Inc., San Jose, CA (US)

( * ) Notice: Subject to any disclaimer, the term of this patent is extended or adjusted under 35 U.S.C. 154(b) by 254 days.

(21) Appl. No.: 12/790,377

(22) Filed: May 28, 2010

(65) Prior Publication Data

US 2011/0295658 A1   Dec. 1, 2011

(51) Int. Cl.
 *G06Q 30/00*   (2012.01)
(52) U.S. Cl. ....................................... 705/14.1
(58) Field of Classification Search .................. 705/14.1
  See application file for complete search history.

(56) References Cited

U.S. PATENT DOCUMENTS

2010/0057550 A1*  3/2010  Nguyen ............... 705/14.25

* cited by examiner

*Primary Examiner* — Daniel Lastra
(74) *Attorney, Agent, or Firm* — Schwegman Lundberg & Woessner, P.A.

(57) ABSTRACT

A crowd-sourcing system performs a method that includes generating a request that a user provide candidate media data to the crowd-sourcing system. The candidate media is descriptive of a product, and the request includes information about the product. The crowd-sourcing system transmits the request to a user system and receives the candidate media data from the user system. The crowd-sourcing system selects the candidate media data as stock media data for the product. The selection of the candidate media data may be based on a selection criterion, such as a grade of the candidate media data determined by the crowd-sourcing system. The crowd-sourcing system provides a reward to the user based on the selecting of the candidate media data as the stock media data for the product.

21 Claims, 7 Drawing Sheets

500

| | SEARCH |
|---|---|
| | 504 |

502

| PRODUCT TITLE 522 | STATUS 524 | VALUE 526 | CATEGORY 528 |
|---|---|---|---|
| BRAND B SHAVER MODEL 909 530 | OPEN 532 | $12.00 534 | ELECTRONICS 536 |
| BRAND F GAMING CONSOLE BLUE | OPEN | $22.00 | VIDEO GAMES |
| BRAND E DIGITAL RECORDER (160 GB) | OPEN | $5.00 | ELECTRONICS |
| BRAND D GPS DEVICE MODEL 404 | CLOSED 538 | $2.99 | ELECTRONICS |
| BRAND C CAMERA WITH 14-42MM LENS | OPEN | $10.49 | CAMERAS & PHOTO |
| BRAND B SHAVER MODEL 202 | 2D 7H 5M 540 | $0.99 | ELECTRONICS |
| BRAND A VACUUM CLEANER MODEL 101 | 5 MEDIA LEFT 542 | $3.99 | HOME & GARDEN |

| PAGE 1 OF 266 | <- | -> | 1 \| 2 \| 3 \| 4 | | GO |
|---|---|---|---|---|---|

*FIG. 5*

COLLECTING MEDIA DATA DESCRIPTIVE OF A PRODUCT

TECHNICAL FIELD

The present application relates generally to the technical field of data collection, and, more particularly, to collecting media data descriptive of one or more products from one or more selected users of a network-based publication system.

BACKGROUND

When a seller of an item creates an advertisement to be included in a listing of items for sale on a network-based publication system (e.g., EBAY®, AMAZON®, or CRAIGSLIST®), the seller may include information about the item in the advertisement. The information may include a title of the item or a description of the item. Furthermore, the seller may be allowed to select media data for inclusion in the advertisement. Examples of media data include an image (e.g., an image file) and a motion picture (e.g., a video file). Despite allowing the seller to select the media data for inclusion in the advertisement, an operator of the network-based publication system may retain control over whether the media data is published on the network-based publication system (e.g., included in the advertisement) for public viewing.

BRIEF DESCRIPTION OF THE DRAWINGS

Some embodiments are illustrated by way of example and not limitation in the figures of the accompanying drawings in which:

FIG. 5 is a block diagram illustrating a user interface presented by the crowd-sourcing system to collect media data descriptive of a product from a user, according to some example embodiments;

DETAILED DESCRIPTION

Figure 1:
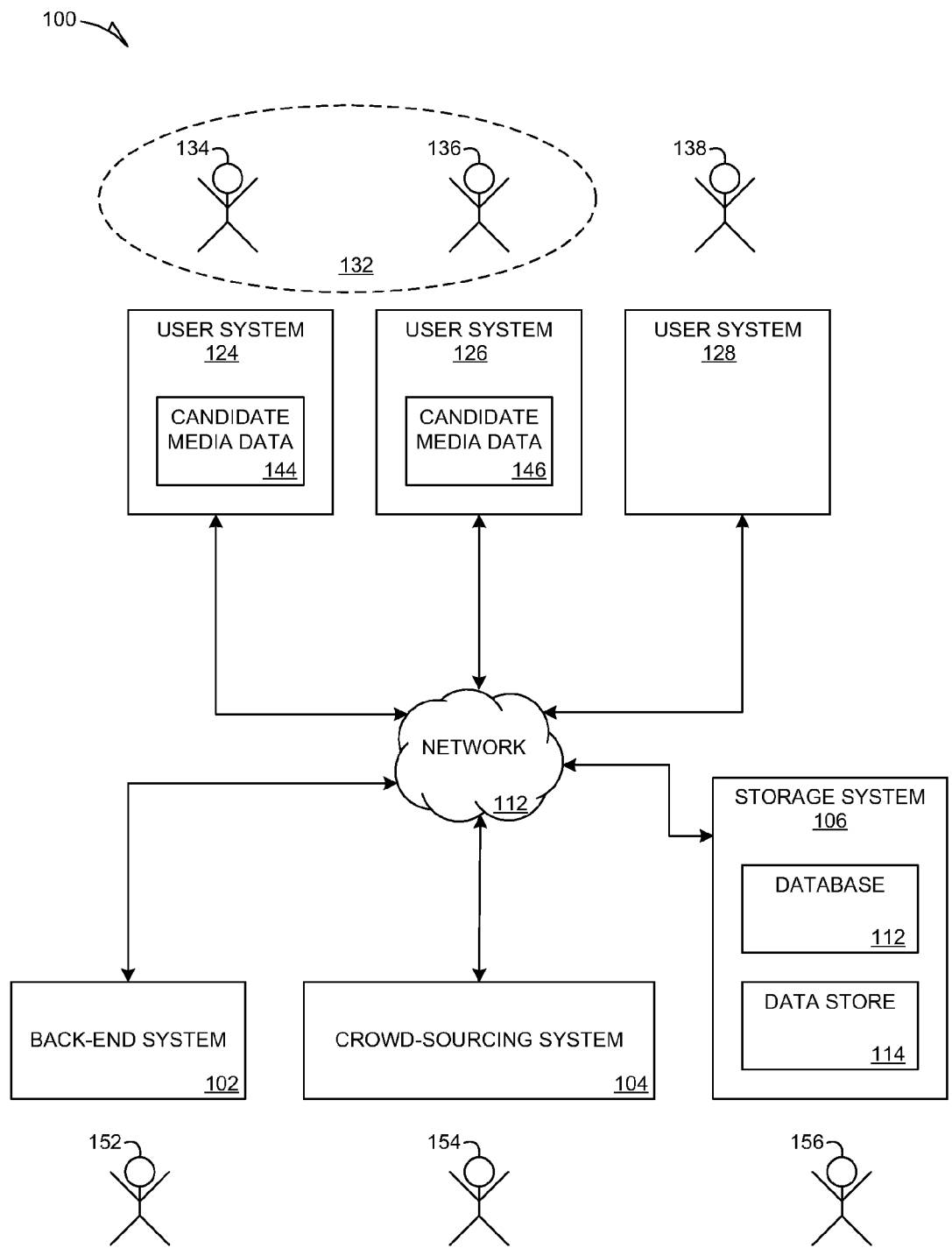
FIG. 1 is a block diagram illustrating an environment in which a crowd-sourcing system executes to collect media data descriptive of one or more products, according to some example embodiments.

In the following description, for purposes of explanation, numerous specific details are set forth in order to provide an understanding of various embodiments of the present subject matter. It will be evident, however, to those skilled in the art that various embodiments may be practiced without these specific details.

The term "product" herein refers to a good or a service of which one or more specimens may be listed by a network-based publication system (e.g., as being available for purchase). Examples of products include a specific brand of shaver having a specific model number, a specific brand of gaming console having a specific color, or a specific brand of digital recorder having a specific storage capacity. Other examples of products include downloadable data (e.g., video, music, or electronic books), an authorization to use downloadable data (e.g., a license), and an obligation to perform a service (e.g., technology consulting or an astrology reading).

As used herein, the term "item" is to be construed as a specimen of a product. Examples of items include a particular shaver (e.g., a single unit), a particular gaming console, or a particular digital recorder. Other examples of items include a particular copy of downloadable data (e.g., a video file, a music file, or an electronic book file), a particular authorization allowing a particular person to use downloadable data, and a particular obligation to perform a service for a particular person.

The phrase "media data" refers to electronic or digital data that embodies media content (e.g., a media content element). Examples of media data include a digital image and a digital video. The phrase "stock media data" herein refers to media data that corresponds to a product. For example, stock media data of a product may correspond to information about the product or be descriptive of a specimen of the product. An example of stock media data is an image of a product that a network-based publication system provides to a user for inclusion in an advertisement of an item for sale on the network-based publication system. The phrase "candidate media data" herein refers to media data that may be considered for selection as stock media data. For example, candidate media data is media data that a user provides to a crowd-sourcing system in response to a request from the crowd-sourcing system to provide media data descriptive of a product.

The phrase "network-based publication system" herein refers to a system that is connected to a network and publishes information via the network. The system may be an electronic commerce system. The information may include information pertinent to one or more products or one or more items. Examples of network-based publication systems include EBAY®, AMAZON®, and CRAIGSLIST®.

The term "user" herein refers to a person or a machine.

An example method of collecting media data descriptive of a product is disclosed. The method includes using a processor of a crowd-sourcing system to perform various operations, the crowd-sourcing system constituting an example system (e.g., a computer system) configured to implement some or all of the example method. The operations of the example method include accessing a database (e.g., a product database) and making a determination to request candidate media data from a user of a network-based publication system. The operations include generating a request that the user provide the candidate media data to the crowd-sourcing system. The request includes information that specifies a product (e.g., by title, manufacturer, model, or version). For example, the request may include a product identifier (e.g., a stock-keeping unit (SKU) number or a universal product code (UPC)). The operations include transmitting the request to the user (e.g., to a machine that corresponds to the user). The operations include receiving the candidate media data from the user (e.g., from a machine that corresponds to the user).

The operations include selecting the candidate media data as stock media data for the product (e.g., stock media that corresponds to the product identifier). The selecting may be based on a selection criterion, such as a grade of the candidate media data determined by the crowd-sourcing system. The operations include storing a reference (e.g., a pointer) to the stock media data in a database record (e.g., in a product database). The operations include providing a reward to the user based on the selecting of the candidate media data as the stock media data for the product. For example, the crowd-sourcing system may calculate an amount (e.g., a cash value) of the reward. The request may include the amount of the reward. To provide the reward to the user, the crowd-sourcing system may increment a stored value account of the user by the amount of the reward.

The crowd-sourcing system may be implemented as a computer system having one or more modules (e.g., hardware modules or software modules) configured to perform one or more of the methodologies discussed herein. The crowd-sourcing system may be configured by instructions stored on a machine-readable medium and executed by one or more processors of the crowd-sourcing system.

FIG. 1 is a block diagram illustrating an environment 100 in which a crowd-sourcing system 104 collects media data descriptive of one or more products, according to some example embodiments. The environment 100 includes users 134, 136, and 138; a subset 132; user systems 124, 126, and 128; a back-end system 102 (e.g., a network-based publication system); the crowd-sourcing system 104; and a storage system 106. The subset 132 includes two of the users 134 and 136. The user systems 124, 126, and 128 respectively correspond to the users 134, 136, and 138. The environment 100 includes operators 152, 154, and 156 (e.g., administrators or owners) of the back-end system 102, the crowd-sourcing system 104, and the storage system 106, respectively. The storage system 106 includes a database 112 and a data store 114. The data store 114 stores media data. The media data may be submitted by the users 134, 136, and 138 and selected by the crowd-sourcing system 104 as stock media data. The database 112 stores one or more database records. Each of the one or more database records may include one or more references (e.g., pointers) to the stock media data contained in the data store 114.

The user systems 124, 126, and 128, the back-end system 102, the crowd-sourcing system 104, and the storage system 106 are connected to each other via a network 112. The network 112 enables communication between systems (e.g., the crowd-sourcing system 104 and the user system 124). Accordingly, the network 112 may be a mobile telephone network, a Plain Old Telephone (POTS) network, a wired network, a wireless network (e.g., a WiFi or WiMax network), or any suitable combination thereof. The communication may be based on one or more communication protocols. Examples of communication protocols include Transmission Control Protocol/Internet Protocol (TCP/IP), HyperText Transfer Protocol (HTTP), File Transfer Protocol (FTP), Simple Mail Transfer Protocol (SMTP), Post Office Protocol (POP), Internet Message Access Protocol (IMAP), Wireless Access Protocol (WAP), Gopher, wireless internet protocols, and instant messaging protocols. The network 112 may be implemented using the Internet, a wide area network (WAN), a local area network (LAN), or any suitable combination thereof.

The users 134, 136, and 138 may be users of the user systems 124, 126, or 128, the back-end system 102, the crowd-sourcing system 104, or the storage system 106. The crowd-sourcing system 104 generates one or more requests that one or more users (e.g., users 134 and 136) provide candidate media data descriptive of one or more products. The crowd-sourcing system 104 transmits the one or more requests to the one or more users (e.g., to user systems 124 and 126). The one or more users may respond to the one or more requests by providing candidate media data (e.g., one or more image files) to the crowd-sourcing system 104. For example, user 134 may provide candidate media data 144 (e.g., a digital image of a product) to the crowd-sourcing system 104. The user system 124 stores the candidate media data 144 and the user system 126 stores candidate media data 146. In some embodiments, one or more of the users 134, 136, and 138 may be one or more of the operators 152, 154, and 156, respectively.

Any of the systems shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 7. Moreover, any two or more of the systems illustrated in FIG. 1 may be combined into a single system, and the functions described herein for any single system may be subdivided among multiple systems.

Figure 2:
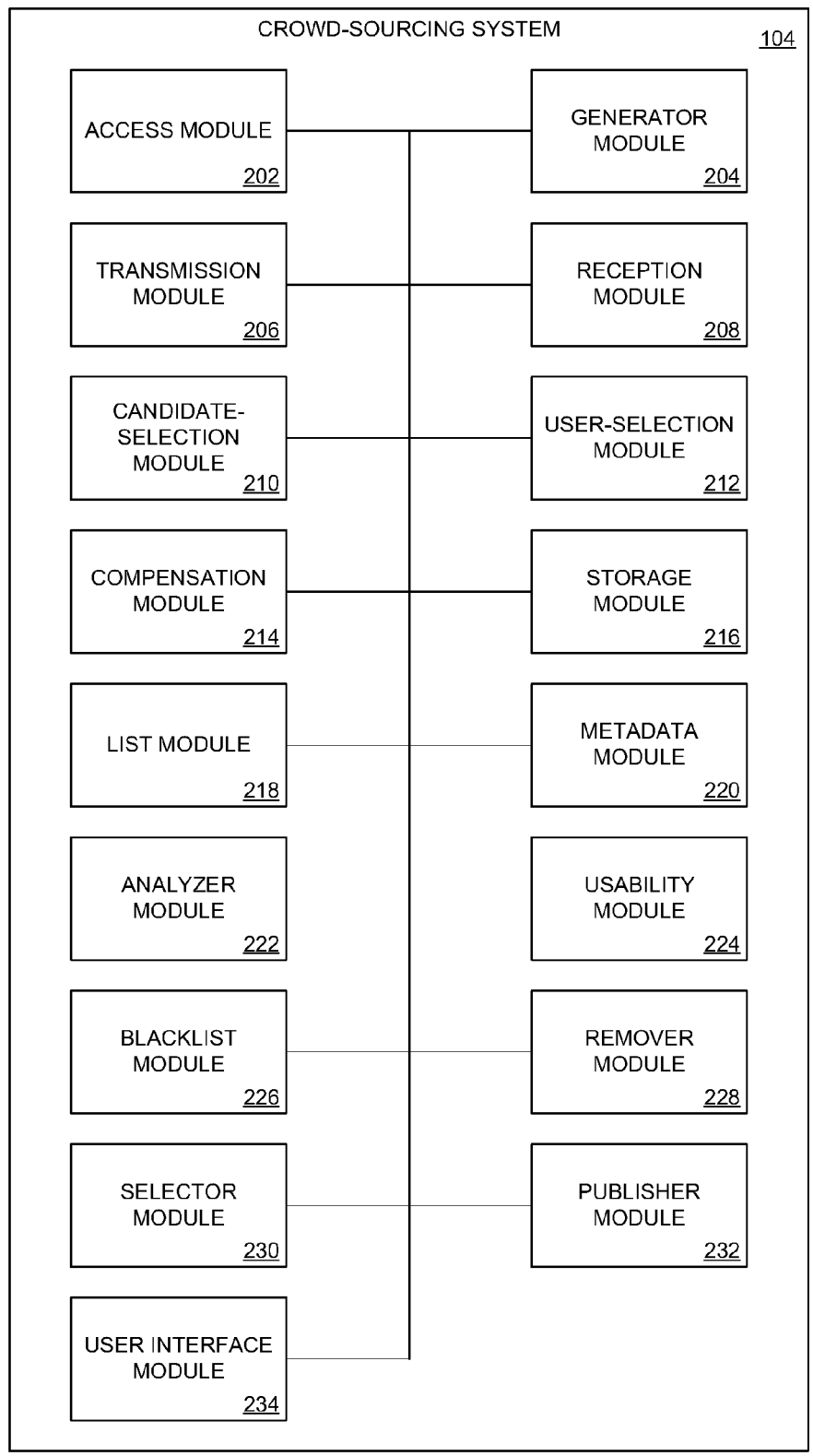
FIG. 2 is a block diagram illustrating modules of a crowd-sourcing system, according to some example embodiments.

FIG. 2 is a block diagram illustrating modules of an example embodiment of the crowd-sourcing system 104. The modules of the crowd-sourcing system 104 are all configured to communicate with each other (e.g., using a bus, a shared memory, or a switch). Any of these modules may be implemented using hardware, software, or a combination of hardware and software. Moreover, any two or more of these modules may be combined into a single module, and the functions described herein for a single module may be subdivided among multiple modules. The crowd-sourcing system 104 includes an access module 202, a generator module 204, and a transmission module 206, among other modules discussed further below.

The access module 202 accesses the storage system 106 to store, modify, or extract information from the storage system 106. The accessing may include using a database management system (DBMS) or relational database management system (RDMS). The accessing may be performed using a query. The query may be constructed by the access module 202 or one of the operators 152, 154, or 156 using a query language (e.g., Structured Query Language (SQL)). An example embodiment of the storage system 106 is described below with respect to FIG. 3.

The generator module 204 generates a request that a user (e.g., user 134) provide candidate media data (e.g., candidate media data 144) that is pertinent to a product (e.g., a product that is specified by a product identifier in the request). The candidate media data may be descriptive of the product, descriptive of a specimen (e.g., an item) of the product, or both. The request specifies (e.g., identifies) the product. In various example embodiments, the request includes a statement that the candidate media data should be descriptive of the product, descriptive of a specimen of the product, or both. The generator module 204 may generate multiple requests respectively for multiple users (e.g., users 134 and 136 in subset 132). A single request may identify multiple products for which candidate media data is requested. In some example embodiments, the generator module 204 generates a single request for multiple users. Accordingly, the generator module 204 may generate one or more requests that one or more of the users 134, 136, and 138 (e.g., the subset 132), each provide candidate media data descriptive of one or more products.

The request generated by the generator module 204 may include information about the candidate media data requested. The information may specify (e.g., identify) one or more products. For example, the information may include a product identifier that uniquely identifies a product within the crowd-sourcing system 104, the back-end system 102, the storage system 106, or any suitable combination thereof. In various example embodiments, the information may indicate that the candidate media data (e.g., candidate media data 144) should be descriptive of a particular product (e.g., a product having particular attributes (or aspects or characterizing marks or traits)). The information may include a title, a brand, a description, a model number, a color, or a version of a product. Moreover, the information may describe one or more views (e.g., a top view, a bottom view, a side view, a front view, or a back view) of a product. The information may describe a minimum quality standard or a standard for rejection of the candidate media data. The minimum quality standard or standard for rejection may correspond to the one or more rules described below with respect to the candidate-selection module 210.

The request generated by the generator module 204 may include information about one or more rewards that the user (e.g., user 134) is to receive in response to the crowd-sourcing system 104 selecting the candidate media data (e.g., candidate media data 144) as stock media data for the product. For example, the request may specify (e.g., include a notification) that each user who submits a candidate image selected as a stock image will receive a $10 cash reward. The generator module 204 may generate a different request for each of multiple users. Each request may specify a different reward based on a profile of the user to which the crowd-sourcing system 104 is to transmit the request. For example, a profile of user 134 may indicate that the user has more photography experience than user 136, and a reward specified for the more experienced user 134 may be greater than a reward specified for the less experienced user 136.

The transmission module 206 transmits outgoing communications from the crowd-sourcing system 104 via the network 112. For example, the transmission module 206 may transmit one or more requests (e.g., generated by the generator module 204) to one or more users (e.g., user 134) at one or more user systems (e.g., user system 124).

The crowd-sourcing system 104 also includes a reception module 208, a candidate-selection module 210, a user-selection module 212, and a compensation module 214. The reception module 208 receives incoming communications to the crowd-sourcing system 104 via the network 112. For example, the reception module 208 may receive candidate media data (e.g., candidate media data 144 and 146) from the subset 132 of users. The subset 132 may provide the candidate media data in response to the one or more requests for the candidate media data. The users 134, 136, and 138 may use the network 112 to send the one or more candidate media data from the user systems 124, 126, and 128 to the crowd-sourcing system 104.

According to various example embodiments, the reception module 208 increments a count of submissions of candidate media data from the users 134, 136, and 138 or a count of submissions of candidate media data from an individual user (e.g., user 134). In certain example embodiments, the reception module 208 receives candidate media data from one of the users 134, 136, and 138 based on the count of the submissions from the users 134, 136, and 138 not transgressing a total user submission threshold. In various example embodiments, the reception module 208 receives candidate media data from an individual user (e.g., user 134) based on the count of the submissions from the individual user not transgressing an individual user submission threshold. The individual user submission threshold may be specific to an individual user (e.g., user 134) or general to two or more of the users 134, 136, and 138. Furthermore, the total user submission threshold or the individual count threshold may be specific to a product or general to two or more products.

One or more of the operators 152, 154, and 156 may specify the total user submission threshold or the individual user submission threshold. For example, operator 152 may specify an individual user submission threshold of 10 that is general to the users 134, 136, and 138, meaning that the reception module 208 may not receive more than 10 submissions of candidate media from any one of the users 134, 136, and 138.

The reception module 208 may calculate the total user submission threshold or an individual user submission threshold based on a determination by another module. For example, reception module 208 may calculate the total user submission threshold on a determination by the compensation module 214 of a reward amount. For example, if the compensation module 214 calculates a reward amount to be offered for candidate media data of a product that is larger than a reward amount to be offered for candidate media data of other products, the reception module 208 may calculate a total user submission threshold for the product that is higher than a total user submission threshold for other products. Thus, the reception module 208 may be configured to receive more candidate media data for a product for which a determination has been made that suggests that there is a greater need for candidate media data of the product relative to other products. As another example, the user-selection module 212 may specify a total user submission threshold or individual submission threshold based on a profile of a user. For example, if a profile of a user suggests that there is a greater likelihood relative to other users that the user will submit candidate media data that will be selected as stock media data for a product (e.g., based on a count of submissions of candidate media data the user that were selected as stock media data), the reception module 208 may calculate an individual submission threshold for the user that is higher than the individual submission threshold for other users.

The candidate-selection module 210 may select one or more of the candidate media data (e.g., the candidate media data 144) submitted by one or more of the users 134, 136, and 138 as stock media data for the product. The candidate-selection module 210 may select the candidate media data based on various criteria. For example, the candidate-selection module 210 may implement one or more rules (e.g., describing a minimum quality standard or a standard for rejection of media data). The one or more rules may be set by one or more of the operators 152, 154, and 156. The various criteria may include one or more characterizing marks or traits of the candidate media data. For example, a rule may specify that an image or video should have a minimum screen resolution to be selected as stock media data. As another example, a rule may specify that a video should have a minimum number of frames per second to be selected as stock media data. As a further example, a rule may specify that the candidate media data should be of a particular type of media data (e.g., an image or a video). The various criteria may include a combination of rules and characterizing marks or traits. In some example embodiments, the candidate-selection module 210 applies an image processing algorithm (e.g., an image recognition algorithm) to one or more of the candidate media data and generates a numerical score corresponding to a degree to which the candidate media satisfies the various criteria. Based on the numerical score transgressing a threshold candidate-selection value, the candidate-selection module 210 determines that the candidate media data is selected as stock media of the product.

In various example embodiments, the candidate-selection module 210 determines that the candidate media data substantially matches the information about a product (e.g., the title, the description, the brand, the manufacturer, the model number, the color, or the version of the product) included in a request. The candidate-selection module 210 determines that there is a substantial match based on a percentage of accuracy with which the candidate media corresponds to the information about the product. For example, the request generated by the generator module 204 may request candidate media data that is descriptive of a camera having a specific manufacturer, a specific model number, and a specific color. In response to the request, the user 134 may submit candidate media data 144. The candidate-selection module 210 determines that the submitted candidate media data 144 illustrates the specific manufacturer and specific model number, but not the specific color. The determination may be based on an application of the image processing algorithm. The determination may be based on input received from one or more of the users 134, 136, and 138 or one or more of the operators 152, 156, and 156. Because the candidate media matches two of three criteria specified in the request, the candidate-selection module 210 determines that the candidate media data 144 matches the information specified in the request with 66% accuracy. If this percentage of accuracy transgresses a threshold substantial-match value (e.g., 60%), the candidate-selection module 210 determines that the candidate media data 144 substantially matches the information about the product. One or more of the operators 152, 154, or 156 may specify the substantial-match value. For example, the operator 154 may specify a substantial-match value of 90%. In this case, candidate media data that matches 66% of the product information specified in a request does not substantially match the product information.

In various example embodiments, the candidate-selection module 210 may select candidate media data (e.g., candidate media data 144) based on whether the candidate media data conforms to one or more rules regarding usability of the candidate media data. One or more of the operators 152, 154, and 156 may specify the rules. For example, operator 152 may specify that candidate media data owned by an entity in Germany is not usable in the United States. The candidate-selection module 210 may use the usability module 224 (described below) to perform one or more usability checks on the candidate media data. If the candidate media data fails a usability check, the candidate-selection module 210 may exclude the candidate media data from selection as stock media data (e.g., of a particular product or of any product).

In various example embodiments, the candidate-selection module 210 selects candidate media data (e.g., candidate media data 144) as stock media data based on whether the candidate media data substantially matches blacklisted media data. Blacklisted media data is media data determined by one or more of the operators 152, 154, and 156 as non-selectable as stock media data. For example, an operator 152 may disapprove or boycott a particular image of a product (e.g., because the media data does not conform to one or more policies established by the operator 152). For example, the operator 152 may be concerned about potential legal problems (e.g., involving copyrights, trademarks, or trade dress). In this case, the operator 152 may operate a user interface to designate candidate media data as blacklisted media data. The candidate-selection module 210 may use the blacklist module 226 described below to perform one or more blacklist checks on the candidate media data. If the candidate media data fails a blacklist check, the candidate-selection module 210 may exclude the candidate media data from selection as stock media data.

The candidate-selection module 210 may select candidate media data (e.g., candidate media data 144) as stock media data based on a grade of the candidate media data. The grade of the candidate media data is a position in a scale of ranks or qualities of the candidate media data. The grade of the candidate media data may be determined by the candidate-selection module 210 based on objective methods or subjective methods. Objective methods are methods that are not peculiar to any particular individual. Subjective methods are methods that are peculiar to a particular individual (e.g., operator 152). Objective methods may include full reference methods, reduced reference methods, or no-reference methods.

Full reference methods are methods that compare the candidate media data 144 with reference media data. Reference media data is media data that is designated (e.g., by one or more of the operators 152, 154, and 156) as media data that satisfies one or more criteria set by one or more of the operators 152, 154, and 156. Reduced reference methods are methods that compare some features of the candidate media data with features of the reference media data. No-reference methods are methods that do not compare the candidate media data with the reference media data.

In various example embodiments, the candidate media data is an image, and a grade of the image is determined by the candidate-selection module 210 based on a quantifiable characteristic of the image. Examples of the quantifiable characteristic include sharpness, noise, dynamic range, contrast, color accuracy, distortion, vignetting, exposure incorrectness, lateral chromatic aberration (LCA), lens flare, or artifacts. Vignetting is a darkening of the image near the corners of the image. Exposure incorrectness is a measure of image detail (e.g., in a highlight or a shadow of the image) that is lost through overexposure or underexposure of the image. LCA is a focusing of colors at different distances from the center of the image. Lens flare is stray light caused by reflections between lens elements or the lens barrel of a camera. Artifacts are blemishes on an image resulting from compression or transmission of the image.

In various example embodiments, the candidate media data is a video, and a grade of the video is determined by the candidate-selection module 210 based on a quantifiable characteristic of the video. For example, the grade of the video may be determined based on a signal-to-noise ratio, a peak signal-to-noise ratio, or a Video Quality Experts Group metric.

The grade of the candidate media data may also be based on subjective methods. Subjective methods may include a determination by an individual (e.g., operator 152) based on a preference of the individual. Subjective methods may include a determination by a group of individuals (e.g., operators 152, 154, and 156) based on an aggregation of preferences from each of the individuals. Thus, the grade may be based on input received from one or more of the users 134, 136, and 138, or one or more of the operators 152, 154, and 156.

The user-selection module 212 selects the subset 132 of the users 134, 136, and 138 from which to request candidate media data (e.g., candidate media data 144). The user-selection module 212 may select the subset 132 based on information about the users 134, 136, and 138 contained in the database 112. For example, the user-selection module 212 may select the subset 132 based on past submissions of candidate media data by each of the users 134, 136, and 138. The user-selection module 212 may select the subset 132 based on a number of the past submissions of candidate media data that the 210 candidate-selection module selected as stock media data for a product.

In various example embodiments, the user-selection module 212 may calculate a likelihood that one or more users (e.g., users 134, 136, and 138) will respond to requests for candidate media data descriptive of a product. The user-selection module 212 may also calculate a likelihood that candidate media data submitted by the users 134, 136, and 138 will be selected (e.g., by the candidate-selection module 210) as stock media data of the product. The calculation may be based on past interactions (e.g., a transaction history or a submission history) of the users 134, 136, and 138 with the back-end system 102 or the crowd-sourcing system 104. For example, the database 112 may contain one or more fields indicating that a user (e.g., user 134) sold, attempted to sell, or purchased a specimen of the product. In this case, the user-selection module 212 may determine that the likelihood that the user has or can capture media data descriptive of the product is greater than the likelihood that other users have or can capture media data descriptive of the product.

The compensation module 214 determines one or more rewards to offer to a user (e.g., user 134) in response to the crowd-sourcing system 104 selecting (e.g., using the candidate-selection module 210) the candidate media data (e.g., candidate media data 144) as stock media data for a product (e.g., the product specified in the request generated by the generator module 204). The one or more rewards may be contingent upon the user assigning one or more rights (e.g., a copyright or license) to one or more of the operators 152, 154, and 156, or to a third party. A reward may be a cash reward. The reward may be reward points that may be redeemable for cash or prizes according to one or more policies of one or more of the operators 152, 154, and 156. The reward may be a coupon. For example, the reward may allow the user to publish a number of advertisements for free using the back-end system 102. The reward may provide the user with a discount on a fee associated with a publishing of an advertisement using the back-end system 102 or an upgrading of the advertisement (e.g., adding a picture or a subtitle to the advertisement).

The compensation module 214 determines an amount (e.g., a cash value) of a reward based on various criteria. One or more of the various criteria may be set by one or more of the operators 152, 154, and 156. For example, the compensation module 214 may determine a different amount for each of the users 134, 136, and 138 based on their respective profiles. The back-end system 102 may store a profile for each of the users 134, 136, and 138 in one or more fields of a user record or another database record. The user record may include one or more fields relating to one or more past interactions (e.g., a transaction history or a submission history) of the user with the back-end system 102 or the crowd-sourcing system 104. The one or more fields of the user record may contain personal information about the user (e.g., a name, address, age, or sex of the user as provided by the user). The one or more fields of the user record may include references to other database records (e.g., a transaction record, a submission record, or both) stored in a database (e.g., a transaction database, submission database, or both) of the storage system 106. A transaction record may include one or more fields indicating that a user (e.g., user 134) bought, sold, attempted to buy, or attempted to sell a specimen of a product using the back-end system 102 (e.g., a network-based publication system). The transaction record may also include information about a value of the specimen (e.g., a listing price, a selling price, or a highest bid).

The user record may include information about a user's past submissions of candidate media data, including a number of the user's past submissions that were selected as stock media data for a product. Thus, the compensation module 214 may determine the amount of the reward based on a likelihood that a user will submit candidate media data (e.g., to the crowd-sourcing system 104). The compensation module 214 may also determine the amount of the reward based on a likelihood that the user's candidate media data will be selected as the stock media data (e.g., by the candidate-selection module 210). For example, if a database record indicates that the user (e.g., user 134) sold, attempted to sell, or purchased a specimen of a product, the compensation module 214 may determine that the user has or can create media data descriptive of the product, basing the reward amount on this determination.

The compensation module 214 may also determine the amount of the reward by determining a supply of, or demand for, stock media data for a particular product. For example, with respect to the supply of the stock media data, the compensation module 214 may base the amount of the reward on a likelihood that a third-party is able to provide the image. The third-party may be an individual or entity (e.g., a service provider) that is external to the environment 100. For example, the third party may be a contract photographer, a private photographer, a photo lab, a trading assistant, or another image source. The compensation module 214 may calculate the likelihood based on a profile of the third-party contained in the database 112.

The compensation module 214 may determine the amount of the reward based on an estimated cost at which the third-party may provide the image. The compensation module 214 may calculate the likelihood or the estimated cost based on analysis of a third-party record stored in the database 112. The third-party-record may contain one or more fields corresponding to past interactions of the third-party with the crowd-sourcing system 104. For example, the third-party record may contain amounts of cash payments that the crowd-sourcing system 104 or the operator 154 paid to the third-party in exchange for images.

The compensation module 214 may determine the amount of the reward based on a rarity of specimens of the product. The compensation module 214 may calculate the rarity of specimens of the product based on a number of listings of advertisements for specimens of the product on the back-end system 102.

The compensation module 214 may determine the amount of the reward based on an average price at which specimens of the product were sold using the back-end system 102. For example, the compensation module 214 may calculate the average sales price based on a history of transactions of specimens of a product. The history of transactions may be stored in one or more product records, transaction records, or both in the database 112. The product record may contain a field for a sale price of each specimen sold.

With respect to the demand for the stock media data, the compensation module 214 may determine the amount of the reward based on an inability or unwillingness of users (e.g., user 128) to provide candidate media data (e.g., candidate media data 144) that conforms to a policy of one or more of the operators 152, 154, and 156. For example, the compensation module 214 may determine the amount of the reward based on a failure of users to provide candidate media data that passes one or more usability checks or blacklist checks. The compensation module 214 may determine the amount of the reward based on a number of submissions of candidate media data by the users.

In various example embodiments, the compensation module 214 determines the amount of the reward based on an expected increase in revenues resulting from the acquiring of the candidate media data as the stock media data. The compensation module 214 may calculate the expected increase in revenues based on an analysis of past revenues received by the back-end system 102 from sales of specimens of products (e.g., comparing revenues received from sales of specimens of a product before and after stock media data was selected for the product). The compensation module 214 may calculate the expected increase in revenues based on transaction fees that one or more of the operators 152, 154, and 156 receive when specimens of a product are sold using the back-end system 102.

The compensation module 214 may cause the generator module 204 to include information about the reward (e.g., a description of the reward or an amount of the reward) in one or more requests for the candidate media data. The compensation module 214 may provide the reward to users (e.g., user 134) who submit candidate media data (e.g., candidate media data 144) that the candidate-selection module 210 selects as stock media data for a product.

The compensation module 214 may provide the reward by incrementing a stored value account of the user by the amount of the reward (e.g., transferring cash to a bank account or increasing a number of reward points in a reward points account). The compensation module 214 may provide the reward by authorizing or initiating a sending (e.g., mailing) of a check, coupon, or other physical prize to the user. The compensation module 214 may notify a user (e.g., user 134) that the compensation module 214 has authorized, initiated, or granted a reward to the user. The compensation module 214 may notify the user of a processing status (e.g., pending, approved, or delivered) of the reward.

The crowd-sourcing system 104 further includes a storage module 216, a list module 218, a metadata module 220, and an analyzer module 222. The storage module 216 stores various media data (e.g., candidate media data or stock media data) in the data store 114 of the storage system 106. The storage module 216 may also store one or more references (e.g., pointers) to the stock media data. The references may be stored in one or more fields (e.g., field 324) of the database 112. The references may associate the stock media data with a product record. For example, the storage module 216 may store a reference to stock media data descriptive of a product in a field (e.g., field 324) of a database record (e.g., a product record) associated with the product.

The list module 218 determines whether the crowd-sourcing system 104 will request candidate media data (e.g., candidate media data 144) for a particular product. In various example embodiments, the list module 218 determines whether to request candidate media for a product based on a quantity of media data (e.g., a number of images) included by users (e.g., users 134 and 136) in advertisements for specimens of the product. Based on the quantity transgressing a data-availability threshold, the crowd-sourcing system determines that the crowd-sourcing system 104 will request the candidate media data. One of the operators 152, 154, and 156 may specify the data-availability threshold. For example, an operator 152 may specify a data-availability threshold of 20 (e.g., 20 images). In this case, the list module 218 determines that the crowd-sourcing system 104 will request candidate media data for the product while the users have provided 20 or fewer submissions of media data (e.g., candidate media data 144) to the crowd-sourcing system 104.

The list module 218 may determine whether the crowd-sourcing system 104 will request candidate media data (e.g., candidate media data 144) for a product based on an absence of stock media data descriptive of a particular view of the product. For example, the list module 218 may determine that the crowd-sourcing system 104 will request candidate media data for a product based on absence of stock media for the product that is descriptive of one or more of the following views of the product: a back view, a side view, a top view, or a bottom view of the product. The list module 218 may determine the absence of stock media data descriptive of a particular view of a product by applying an image recognition algorithm. The list module 218 may determine the absence of the stock media descriptive of a particular view of a product based on input received from one or more of the users 134, 136, and 138, or one or more of the operators 152, 154, and 156.

The list module 218 may determine that the crowd-sourcing system 104 will request the candidate media data (e.g., candidate media data 144) based on a notification from the back-end system 102. For example, the back-end system 102 may notify the crowd-sourcing system 104 that there is an absence of stock media data descriptive of a product. In this case, the list module 218 may determine that the crowd-sourcing system 104 will request candidate media data descriptive of the product.

If the list module 218 determines that the crowd-sourcing system 104 will request candidate media data, the list module 218 may invoke one or more functionalities of other modules (e.g., the generator module 204). Alternatively, if the list module 218 determines that the crowd-sourcing system 104 will not request the candidate media data, the list module 218 may determine to not invoke the functionalities of any other modules.

The metadata module 220 generates metadata and associates the metadata with media data (e.g., stock media data or candidate media data). The metadata is stored in the storage system 106 (e.g., in the database 112 or the data store 114). The metadata includes a source identifier that uniquely identifies the source of the image. The metadata may include information about one or more geographic locations (e.g., a country, city, street, or global positioning satellite (GPS) coordinates) of the source of the media data. The metadata may include information about one or more grades of the media data.

The metadata module 220 may include an application program interface (API) to manage the metadata. An application (e.g., a hardware application or a software application) executing on a machine (e.g., user system 128) external to the crowd-sourcing system 104 may communicate with (e.g., call) the API to create, modify, or delete the metadata using the metadata module 220. For example, the application may call the API to link metadata to candidate media data (e.g., candidate media data 144) or stock media data. The metadata module 220 may present a user interface (e.g., using the back-end system 102). The user interface may include one or more user interface components (e.g., menu bars, menu items, toolbar buttons, dialog boxes, etc.) corresponding to functions of the metadata module 220. For example, the user interface may include one or more menu items for creating, modifying, or deleting metadata associated with candidate media data submitted by the users 134, 136, and 138.

The analyzer module 222 analyzes candidate media data (e.g., candidate media data 144). In various example embodiments, the analyzer module 222 determines whether candidate media data is likely to conform to one or more policies set by the one or more of the operators 152, 154, and 156. The analyzer module 222 may determine whether the candidate media data is likely to have a grade that transgresses a threshold grade. For example, the analyzer module 222 may estimate a grade of the candidate media data based on metadata linked to the candidate media. The metadata may include a size of a file containing the candidate media data or information about the source of the candidate media data.

The analyzer module 222 may determine whether the candidate media data (e.g., candidate media data 144) is likely to have a grade that transgresses a threshold based on information in the database 112. For example, the analyzer module 222 may determine that the candidate media data is likely to be selected as stock media data based on an average grade of a user's past submissions of candidate media data transgressing a threshold grade with respect to one or more objective quality metrics. In various example embodiments, the analyzer module 222 determines that a candidate image submitted by a user (e.g., user 134) is likely to be selected as a stock media image based on a determination that the user's past submissions of images had an average grade that placed them in the top 10% of all submitted candidate images, thus transgressing a threshold grade set at the top 30%. The threshold grade may be set by one or more of the operators 152, 154, and 156.

Additionally, the analyzer module 222 may determine that the candidate media data (e.g., candidate media data 144) submitted by a particular user (e.g., user 134) has passed one or more usability checks or blacklist checks with a consistency that transgresses a consistency threshold. For example, the analyzer module 222 may determine that candidate media data submitted by a user is likely to be selected as stock media data based on a determination that the user's past submissions of candidate media data passed one or more blacklist checks or usability checks at a rate of 95%, which transgresses a consistency threshold of 90%. One or more of the operators 152, 154, and 156 may specify the consistency threshold. Usability checks are described below with respect to the usability module 224. Blacklist checks are described below with respect to the blacklist module 226.

Based on the above analysis, the analyzer module 222 may designate a user (e.g., user 134) as a trusted user. Submissions of candidate media data (e.g., candidate media data 144) by a trusted user may require less scrutiny by the crowd-sourcing system 104. For example, the analyzer module 222 may cause fewer usability checks or blacklist checks to be executed for candidate media data submitted by a trusted user and more usability checks or blacklist checks to be executed for candidate media data submitted by other users.

In addition, the analyzer module 222 may assign candidate media data (e.g., candidate media data 144) submitted by a trusted user a higher priority (e.g., processor priority within the crowd-sourcing system 104) than candidate media data submitted by other users. For example, if a trusted user and another user each provide candidate media data having identical grades with respect to one or more objective quality metrics, the analyzer module 222 may cause the candidate-selection module 210 to select as the stock media data the candidate media data submitted by the trusted user, instead of the candidate media data submitted by the other user.

The crowd-sourcing system 104 also includes a usability module 224, a blacklist module 226, and a remover module 228. The usability module 224 performs one or more usability checks to determine whether media data (e.g., candidate media data or stock media data) is usable. As used herein, media data is "usable" if it conforms to one or more rules. One or more of the operators 152, 154, and 156 may define the rules. For example, a rule may specify that media data is always usable in a particular geographic area. As another example, a rule may specify that media data is usable in a particular geographic area if the media data is public domain media data (e.g., free of legal restrictions on use).

The usability module 224 may determine whether the media data (e.g., candidate media data 144) is usable based on input received from one or more of the user 134, 136, and 138 or one or more of the operators 152, 154, and 156. The usability module 224 may determine whether media data is usable based on metadata associated with the media data, such as metadata that associates the media data with a particular geographic area or flags the media data as unusable in a particular geographic area. The usability module 224 may determine whether the media data is usable based one or more rules that specify whether candidate media data acquired from users in one geographic area can be published on a web site (e.g., a web site associated with the back-end system 102) in another geographic area.

The usability module 224 may determine whether the media data (e.g., candidate media data 144) is usable based on receiving permission (e.g., an authorization) from an owner of the candidate media data. The usability module 224 may determine whether the media data is usable by identifying that the candidate media data substantially matches media data referenced in one or more catalogs of media data. In various example embodiments, a catalog contains media data or references to media data, and the catalog indicates whether the media data is usable or unusable in a particular geographic area. The usability module 224 may present a user interface (e.g., using the back-end system 102). The user interface may include user interface elements to create, modify, or delete the catalog. Thus, one or more of the operators 152, 154, and 156 may use the usability module 224 to create, modify, or delete the catalogs.

For example, the usability module 224 may determine that an image published on a web site in Germany should not be published on a web site in the United States based on a determination that the owner of the image has not given permission for the image to be published on a web site outside of Germany. In this case, the image fails the usability check. The usability module 224 may process received candidate media data (e.g., candidate media data 144) to determine whether the candidate media data matches media data (e.g., reference media data) contained in catalogs of media data that indicate various media data as being usable or unusable in a particular geographic area. The usability module 224 may process media data submitted as candidate media data or selected as stock media data.

The blacklist module 226 performs a blacklist check to determine whether the media data (e.g., candidate media data or stock media data) is blacklisted media data. For example, the blacklist module 226 may determine that an image submitted as candidate media data (e.g., candidate media data 144) by a user (e.g., user 134) substantially matches all or a portion of a blacklisted image referenced by a catalog of blacklisted images. The blacklist module 226 may maintain one or more catalogs of blacklisted media data for comparison with media data. The blacklist module 226 may interact with applications provided by a third-party (e.g., a web service provided by a system external to the environment 100) to determine whether the candidate media data is blacklisted media data.

The blacklist module 226 may present a user interface (e.g., using the back-end system 102). The user interface may include user interface elements that allow one or more of the operators 152, 154, and 156 to create, modify, or remove the catalogs of blacklisted media data. For example, operator 152 may add media data to a catalog of blacklisted media data after identifying the media data as blacklisted media data. As another example, the operator 152 or the blacklist module 226 may add the media data to a catalog of blacklisted media data in response to being informed by a user or third party that the media data may violate a copyright of an owner of the media data.

The blacklist module 226 may process the media data to determine whether the media data (e.g., candidate media data 144) substantially matches blacklisted media data contained in the catalogs of blacklisted media data. If the media data substantially matches blacklisted media data, the media data fails the blacklist check. The blacklist module 226 may prevent the candidate media data from being selected as stock media data. For example, the blacklist module 226 may flag the candidate media data (e.g., using the metadata module 220) as being ineligible for selection as stock media data. In response, the candidate-selection module 210 may exclude the candidate media data from consideration for selection as stock media data. The blacklist module 226 may process candidate media data or stock media data.

The remover module 228 may remove media data (e.g., candidate media data or stock media data) that violates one or more policies of one or more of the operators 152, 154, and 156. For example, upon a determination by the usability module 224 that the media data (e.g., candidate media data 144) failed a usability check or a blacklist check, the remover module 228 may remove all instances of the media data from the data store 114. As another example, the remover module 228 may remove all references to the media data from the database 112. The removal of all instances of the media data may affect other systems (e.g., the back-end system 102). For example, the removal of all instances of the media data may cause the media data to be removed from one or more advertisements published by the back-end system 102.

The crowd-sourcing system 104 also includes a selector module 230, a publisher module 232, and a user interface module 234. The selector module 230 designates media data (e.g., candidate media data 144) contained in the data store 114 as being eligible for one or more uses (e.g., eligible for publication on a web site) by the back-end system 102 or the crowd-sourcing system 104. For example, the selector module 230 may designate stock media data as being eligible for publication on a web site presented by the back-end system 102 based on a result of blacklist check (e.g., performed using the blacklist module 226), a usability check (e.g., performed using the usability module 224), or a quality check (e.g., performed using the candidate-selection module 210). Thus, the selector module 230 may select a subset of the media data contained in the data store 114 as being eligible for publication on the back-end system 102 (e.g., for inclusion by a seller in an advertisement of a for-sale item on the back-end system 102).

The publisher module 232 publishes one or more of the media data (e.g., stock media data) contained in the data store 114. The publisher module 232 may publish the media data based on a designation of the media data (e.g., performed using the selector module 230). The publisher module 232 may incorporate a reference (e.g., a pointer) to the stock media data into a web page of a web site presented by the back-end system 102 or the crowd-sourcing system 104. The publisher module 232 may designate the stock media data as published media data (e.g., by associating metadata with the media data using the metadata module 220).

The publisher module 232 may transmit a copy of or a reference to the stock media data to the back-end system 102 or another system for publication of the stock media data. The publisher module 232 may grant one or more permissions to the back-end system 102 or another system to access the stock media data stored on the database system 106 for publication of the stock media data. The publisher module 232 may grant the one or more permissions based on licensing information stored at the back-end system 102 or the other system. For example, the publisher module 232 may transmit the media data to the back-end system 102 for publication (e.g., in response to a request by the network-based publication system for the media data).

In response to receiving the media data (e.g., stock media data) and permission to make the media data available to the users (e.g., users 134, 136, and 138), the back-end system 102 may publish the media data. For example, the back-end system 102 may present published stock media data to the user for inclusion in an advertisement for the sale of an item. The published stock media data may be selectable by the user from a library of media data provided by the back-end system 102 or the crowd-sourcing system 104. The media data may illustrate one or more views of the product of which the item is a specimen. For example, the media data may illustrate a front, back, side, top, or bottom view of the product, the item, or both. The user (e.g., user 134) may select one or more of the published stock media data (e.g., stock photos) of the product for inclusion in the advertisement. The publisher module 232 may transmit the media data to another system (e.g., based on a request by the other system for the media data). The other system may be maintained by a third-party. The publisher module 232 may publish the media data (e.g., present a user interface for manipulation or use of the published media data by users of the crowd-sourcing system 104) independently of any use of the published media data by another system (e.g., the back-end system 102 or the other system).

The user interface module 234 may present one or more user interfaces to facilitate collecting media data (e.g., candidate media data 144) descriptive of one or more products. The user interfaces may be adapted to various client devices. For example, the user interfaces may be served as web pages adapted for a personal computer executing a web browser (e.g., Windows® Internet Explorer®) or a mobile device (e.g., an iPhone®) executing a mobile web browser. The user interfaces may be included in native applications of the various client devices. For example, the user interfaces may be included in a client application (e.g., a Windows® application, an iPhone® application, or an Android® application). The user interfaces may be presented as a plug-in of a client application. The user interfaces may be included in server applications. The user interfaces may be provided as services of a web services provider.

The user interfaces may include a login widget or an account creation widget through which users can log into an account or create an account, respectively, for participating in the collection of candidate media data by the crowd-sourcing system 104. A widget may be a user interface component that corresponds to a particular functionality (e.g., sign in, account creation, searching, browsing, etc.). The widgets may be arranged on a view or a page of one of the user interfaces.

Accounts (e.g., user accounts) created for the collecting of the media data using the crowd-sourcing system 104 may be linked to accounts created for accessing one or more applications (e.g., an advertising publication application) of another system (e.g., the back-end system 102). The user interfaces may be consolidated on a single web site or web page dedicated to the collecting of candidate media data (e.g., candidate media data 144). For example, the user interfaces may include a listing of one or more products that the crowd-sourcing system 104 seeks to acquire from the user 134, 136, or 138. The listing provided to a particular user may be based on whether the particular user is included in the subset 132. The listing provided to a particular user may be based on a profile of the user. An example embodiment of a user interface for the collecting of media data descriptive of one or more products is discussed below with respect to FIG. 5.

Figure 3:
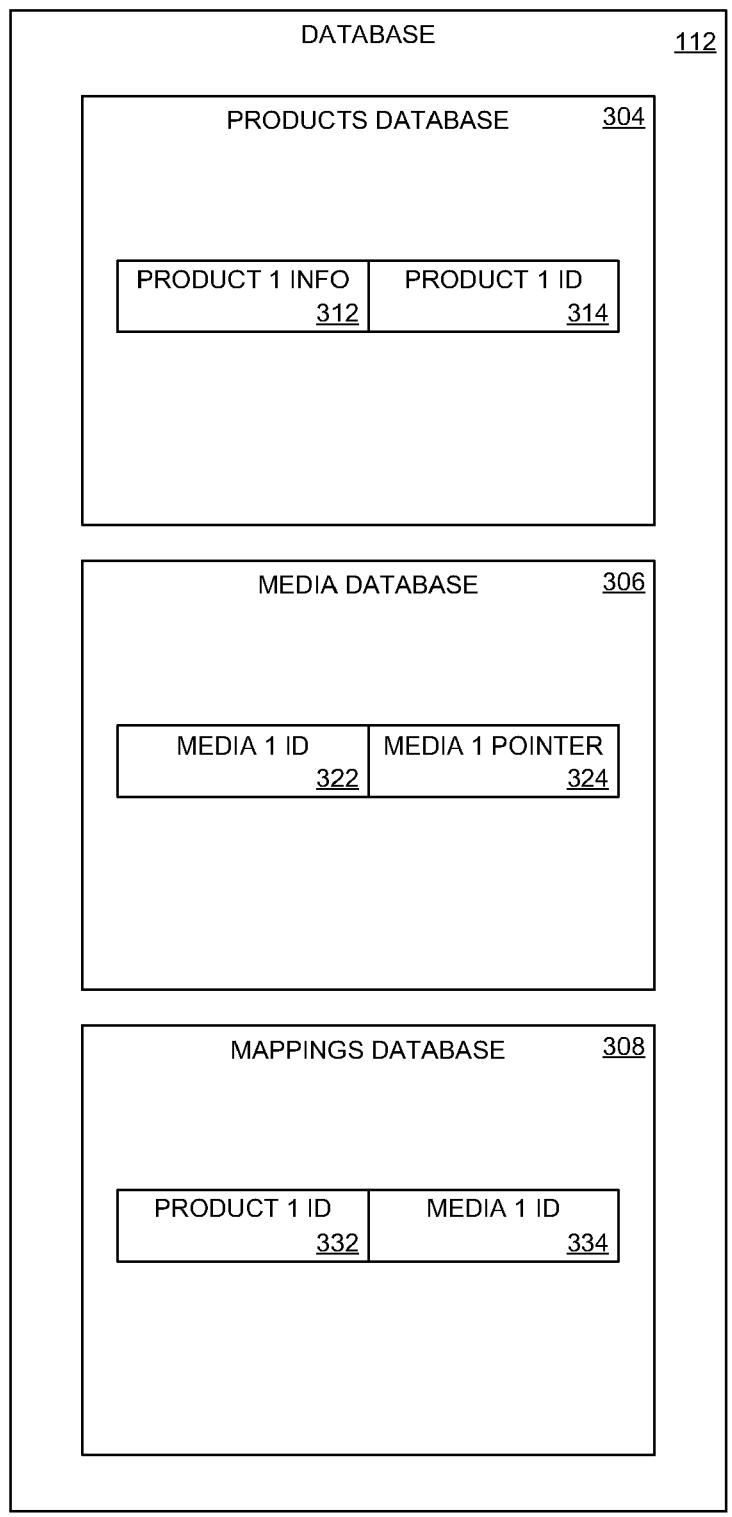
FIG. 3 is a block diagram illustrating a database, according to some example embodiments.

FIG. 3 is a block diagram illustrating an example embodiment of the database 112. The database 112 includes a products database 304, a media database 306, and a mappings database 308. The products database 304 specifies correspondences between product information and product identifiers. The products database 304 includes one or more product records. Each product record may include a field 314 for a product identifier (e.g., "PRODUCT 1 ID"). The product identifier may uniquely identify a product within the crowd-sourcing system 104 or the back-end system 102. Each product record may include a field 312 for information about the product (e.g., "PRODUCT 1 INFO"). The field 312 may store a title, a description, a model number, or other characteristics of the product.

The media database 306 specifies correspondences between media data and media data identifiers. The media database 306 includes one or more media data records. Each media data record may include a field 322 for a media data identifier (e.g., "MEDIA 1 ID") and a pointer 324 (e.g., "MEDIA 1 POINTER") to stock media data in the data store 114. The media data identifier may uniquely identify the stock media data within the crowd-sourcing system 104 or the back-end system 102.

The mappings database 308 specifies correspondences between information about a product and media data descriptive of the product. The mappings database 308 includes one or more mapping records. Each mapping record may include a field 332 for a product identifier (e.g., "PRODUCT 1 ID") and a field 334 for a media data identifier (e.g., "MEDIA 1 ID"). The media data identifier corresponds to media data (e.g., stock media data) descriptive of the product. For example, the media data identifier may correspond to a photographic image of the product taken from a particular angle (e.g., a view). Although the mappings database 308 depicts a mappings record with a single field 332 for a product identifier and a single field 334 for a media data identifier, a mappings record may include multiple fields for media data identifiers. Thus, the mappings database 308 may map information about a product to multiple instances of stock media data (e.g., for multiple views of the product).

Figure 4:
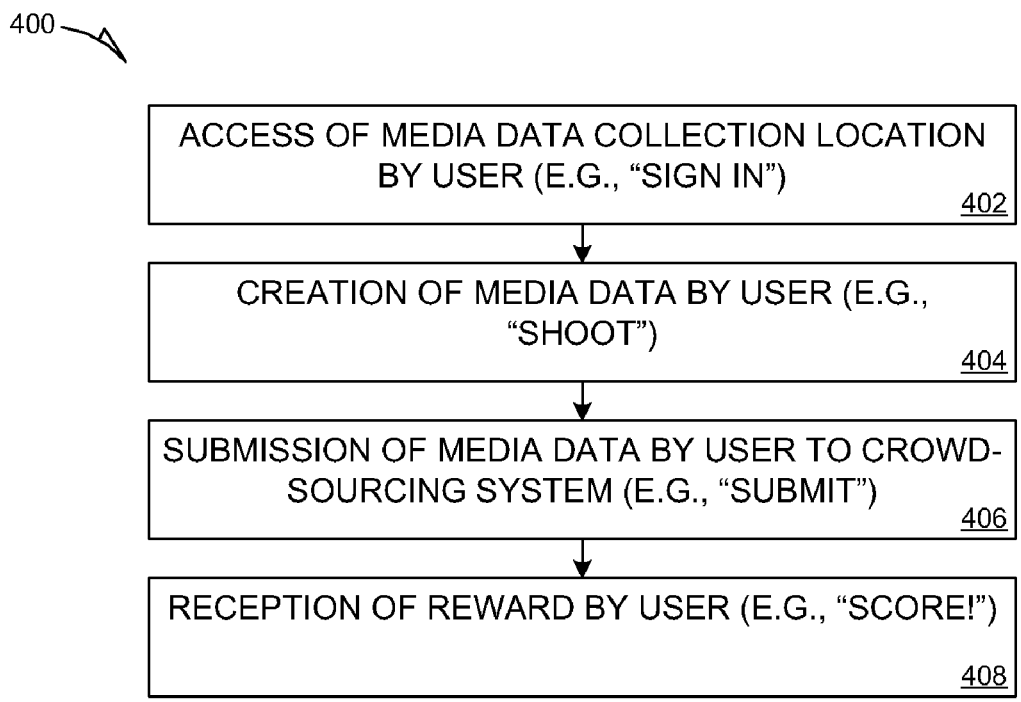
FIG. 4 is a flowchart illustrating a method by which a user may provide media data descriptive of a product to the crowd-sourcing system, according to some example embodiments.

FIG. 4 is a flowchart illustrating an example method 400 by which a user 134 provides candidate media data (e.g., candidate media 144) to the crowd-sourcing system 104. As noted above, the candidate media data is descriptive of a product and descriptive of a specimen of the product. At operation 402, the user interface module 234 presents the user 134 with a user interface. The user interface may include a login widget or account creation widget through which the user 134 may log in or create a user account for providing the candidate media data. The user interface may include a listing widget that displays a listing of one or more products for which submissions of candidate media data are requested from the user. The listing may include information about a product. The information may include a title of the product, a status of a request that users provide candidate media data for the product, an amount of a reward that the user may receive if the user's candidate media data is selected as stock media data for the product, or a category of the product (e.g., electronics, video games, cameras and photo, or home and garden).

At operation 404, the crowd-sourcing system 104 waits while the user 134 creates candidate media data 144 descriptive of one of the products included in the listing. For example, the user 134 may take a digital photograph of a product from a specific angle (e.g., a view). At operation 406, the reception module 208 receives the candidate media data 144 from the user system 124. For example, the user 134 may use a file-selection widget of the user interface to initiate a transmission of a file containing the candidate media data 144 to the crowd-sourcing system 104. Upon receiving the candidate media data 144, the crowd-sourcing system 104 processes the candidate media data 144 (e.g., using a method described below with respect to FIG. 6). At operation 408, the compensation module 214 provides the user 134 with a reward in response to a selection (e.g., by the candidate-selection module 210) of the candidate media data 144 as stock media data for the product.

FIG. 5 is a block diagram illustrating an example embodiment of a user interface 500 presented by the user interface module 234. The user interface 500 includes a listing 502 of products for which candidate media data (e.g., candidate media data 144) is requested. The listing 502 includes information about the products. As shown, the information is presented in columns corresponding to product titles, requests statuses, reward amounts, and product categories. The columns have respective column headings 522 (e.g., "PRODUCT TITLE"), 524 (e.g., "STATUS"), 526 (e.g., "VALUE"), and 528 (e.g., "CATEGORY"). Information about each product is provided in fields presented below the column headings. For example, information about a first product in the listing includes the brand and model of an electronic razor (e.g., "BRAND B SHAVER MODEL 909") in a product field 530 under the column heading 522 labeled "PRODUCT TITLE." A status field 532 indicates whether submissions of candidate media data are currently being accepted (e.g., "OPEN").

The information about the first product includes an amount of a reward, expressed as a value of the selection of candidate media data as stock media data for the product (e.g., "$12.00"). The amount appears in a value field 534 under the column heading 526. The information further includes a category of the product (e.g., "ELECTRONICS") in a category field 536 under the column heading 528.

A status field 538 of a second product specifies that submissions of candidate media data descriptive of the second product are not being accepted (e.g., "CLOSED"). A status field 540 of a third product specifies a time remaining (e.g., "2 D 7 H 5 M" or "2 days, 7 hours, five minutes") for submissions of candidate media data descriptive of the third product. A status field 542 of a fourth product specifies that submissions of candidate media data for the fourth product will be no longer be accepted after a number of additional submissions are received from users (e.g., "5 MEDIA DATA LEFT").

The time remaining for submission of a candidate image may be calculated by the crowd-sourcing system 104 (e.g., using the compensation module 214) based on a number of submissions received over a time period and a threshold number of submissions. If the number of submissions received in the time remaining exceeds the threshold number (e.g., 20), the crowd-sourcing system 104 may nevertheless continue to receive submissions of candidate media data from users until an expiration of the time remaining The listing includes a search widget 504 for searching the listing of requests for candidate images of the one or more products.

Figure 6:
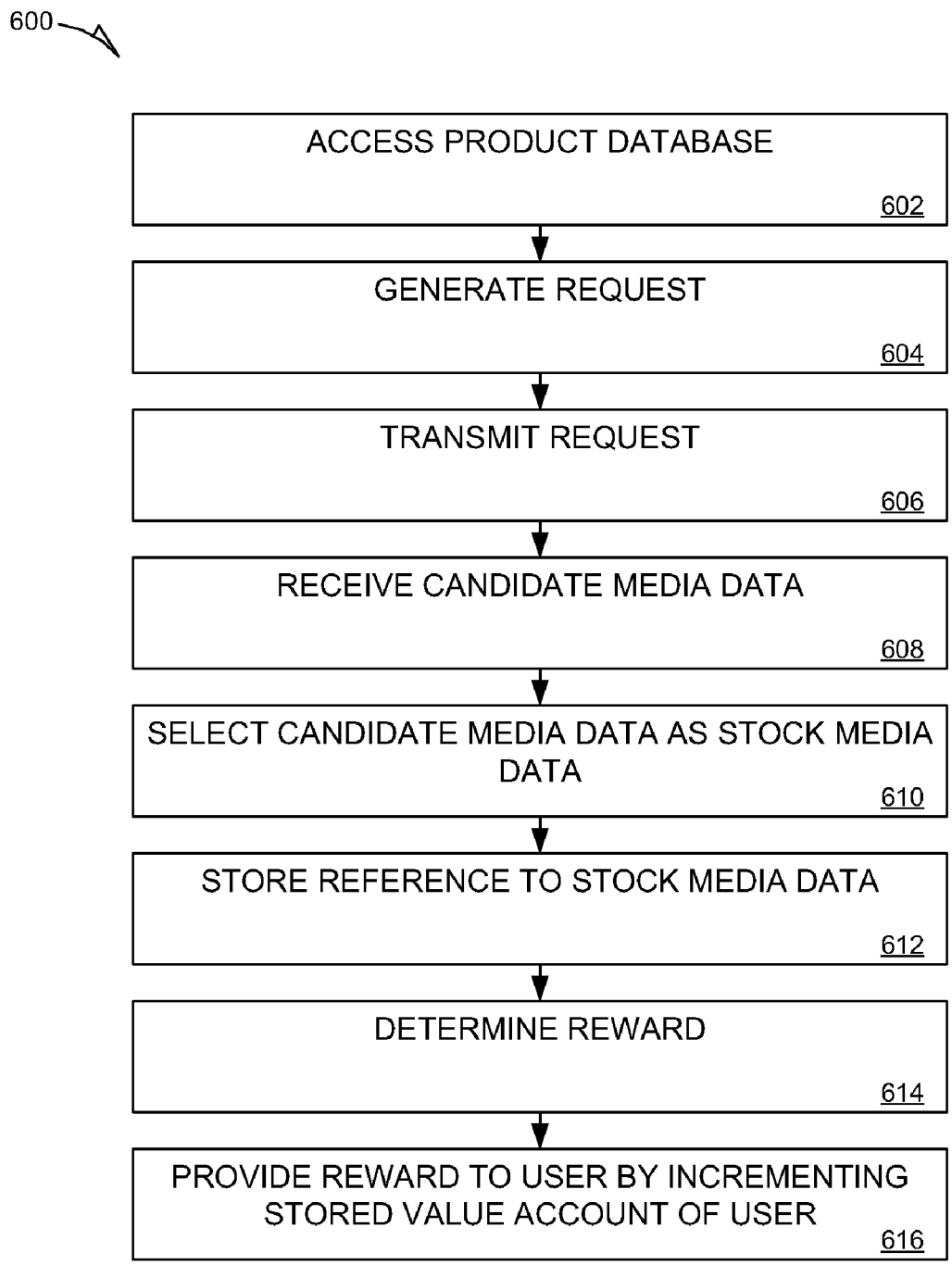
FIG. 6 is a flowchart illustrating a method of collecting media data descriptive of one or more products, according to some example embodiments.

FIG. 6 is a flowchart of an example method 600 by which the crowd-sourcing system 104 collects media data descriptive of one or more products from the users 134, 136, and 138. At operation 602, the access module 202 of the crowd-sourcing system 104 accesses a product database. The accessing of the product database may allow the crowd-sourcing system 102 to determine (e.g., using the compensation module 214 or the list module 218) whether to request media data descriptive of each of the one or more products. At operation 604, the generator module 204 of the crowd-sourcing system 104 generates one or more requests that one or more of the users 134, 136, and 138 submit one or more candidate media data (e.g., candidate media data 144) descriptive of one or more products to the crowd-sourcing system 104. At operation 606, the transmission module 206 of the crowd-sourcing system 104 transmits the one or more requests to the one or more users (e.g., via one or more of the user systems 124, 126, and 128).

At operation 608, the reception module 208 of the crowd-sourcing system 104 receives candidate media data (e.g., candidate media data 144) from at least one of the users 134, 136, and 138. At operation 610, the candidate-selection module 210 of the crowd-sourcing system 104 selects one or more of the candidate media data (e.g., candidate media data 144) as the stock media data. At operation 612, the storage module 216 of the crowd-sourcing system 104 stores one or more references (e.g., pointers) to the stock media data.

At operation 614, the compensation module 214 of the crowd-sourcing system 104 calculates an amount of a reward to provide to each of the users 134, 136, and 138 who provided the candidate media data that was selected as the stock media data. At operation 616, the compensation module 214 of the crowd-sourcing system 104 provides the reward to each of the users 134, 136, and 138 who provided the candidate media data that was selected as stock media data. The providing of the reward may include incrementing (or increasing) a stored value account of each of the users 134, 136, and 138 who provided the candidate media data that was selected by stock media data by the amount. In various example embodiments, the providing of the reward may include initiating a process to provide the reward to the user (e.g., user 134) in physical form (e.g., a check or a coupon).

Figure 7:
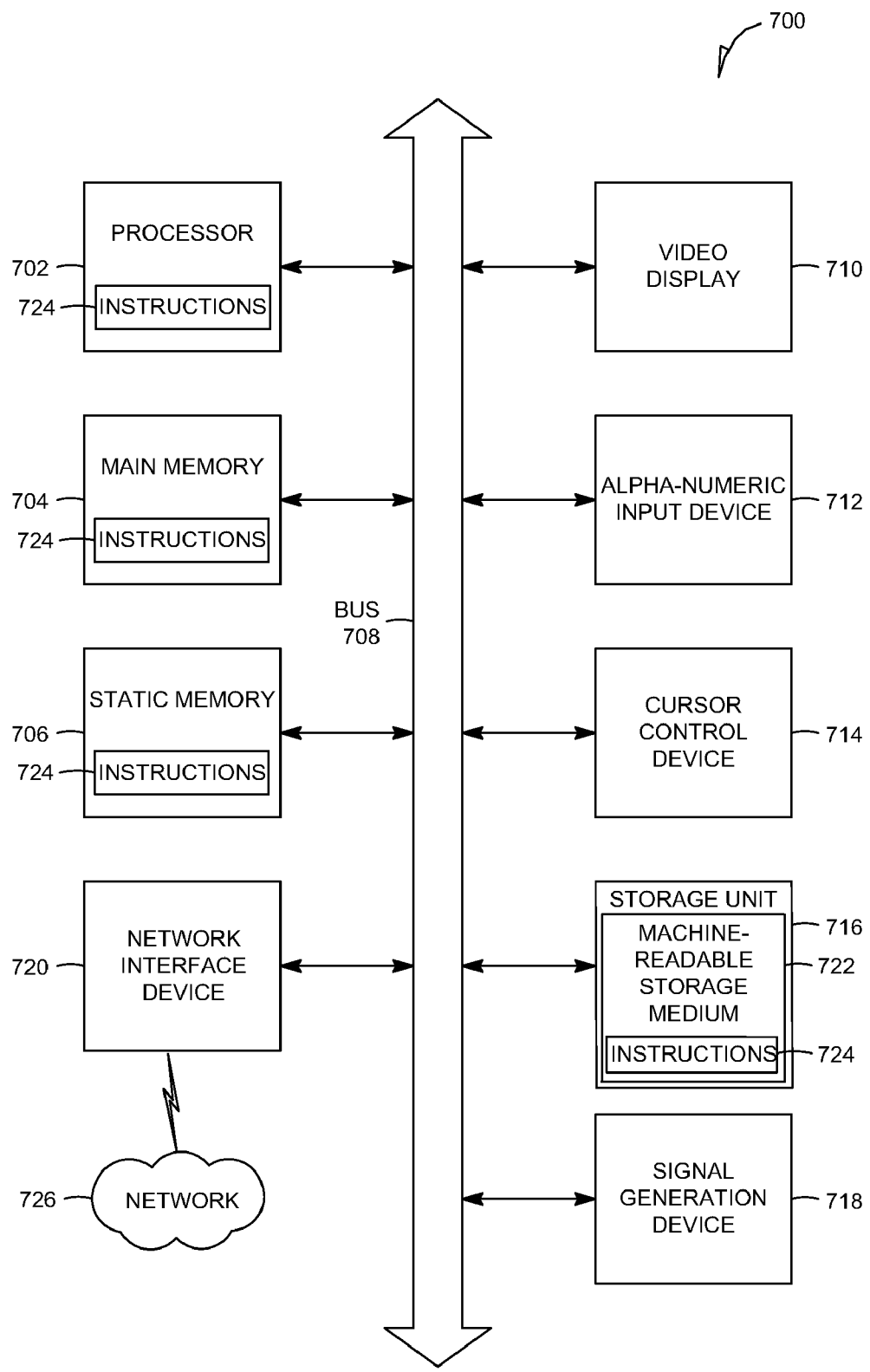
FIG. 7 is a block diagram illustrating components of a machine, according to some example embodiments, able to read instructions from a machine-readable medium and perform any one or more of the methodologies discussed herein.

FIG. 7 is a block diagram of machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or as one or more user systems in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processor 702 (e.g., a central processing unit (CPU), a graphics processing unit (GPU) or both), a main memory 704, and a static memory 706, which communicate with each other using a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a storage unit 716 (e.g., a disk drive unit), a signal generation device 718 (e.g., a speaker), and a network interface device 720.

The disk drive unit 716 includes a machine-readable storage medium 722 on which is stored one or more sets of instructions 724 and data structures embodying or utilized by any one or more of the methodologies or functions described herein. The sets of instructions 724 and data structures may be embodied as software. The instructions 724 may also reside, completely or at least partially, within the main memory 704 or within the processor 702 during execution thereof by the computer system 700, the main memory 704 and the processor 702 also constituting machine-readable media. The instructions 724 may also reside, completely or at least partially, within the static memory 706.

While the machine-readable storage medium 722 is shown in an example embodiment to be a single medium, the term "machine-readable medium" may include a single medium or multiple media (e.g., a centralized or distributed database, or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, optical media, and magnetic media. Machine-readable media may include non-volatile memory. The non-volatile memory may include semiconductor memory devices. The semiconductor memory devices may include Erasable Programmable Read-Only Memory (EPROM), Electrically Erasable Programmable Read-Only Memory (EEPROM), flash memory devices, magnetic disks such as internal hard disks, removable disks, magneto-optical disks, compact-disc-read-only memory (CD-ROM) disks, or digital versatile disc (or digital video disc) read-only memory (DVD-ROM) disks.

The instructions 724 may further be transmitted or received over a communications network 726 (e.g., network 112) using a transmission medium. The instructions 724 may be transmitted using the network interface device 720 and any one of a number of transfer protocols (e.g., HTTP). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access (e.g., the data store). For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible using a network (e.g., the Internet) and using one or more appropriate interfaces (e.g., APIs).

Example embodiments may be implemented in digital electronic circuitry, or in computer hardware, firmware, software, or any suitable combination thereof. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Although example embodiments are illustrated and described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
accessing a database, the database storing a product record, the product record including information about a product;
generating a request that a user of a system connected to the database provide candidate media data descriptive of the product, the request including at least some of the information about the product;
transmitting the request to the user, the transmitting being performed by a processor;
receiving the candidate media data;
selecting the candidate media data as stock media data of the product; and
storing a reference to the stock media data in the database to associate the stock media data with the product record, the stock media data being accessible for use by one or more other users of the system.

2. The method of claim 1, further comprising:
including in the request information about a reward to be provided to the user in response to the selecting of the candidate media data as the stock media data; and
providing the reward to the user in response to the selecting of the candidate media data as the stock media data.

3. The method of claim 2, wherein:
the providing of the reward includes increasing a stored value account of the user by an amount of the reward;
the stored value account corresponds to at least one of money, a gift card, a coupon, and reward points; and
the information about the reward includes the amount of the reward.

4. The method of claim 3, further comprising calculating the amount of the reward based on a count of listings that are published by a network-based publication system and that reference the product.

5. The method of claim 3, further comprising calculating the amount of the reward based on a number of submissions of further candidate media data attributed to the user.

6. The method of claim 1, further comprising selecting the user from a plurality of users of any of a plurality of systems connected to the database, the selecting of the user based on a profile of the user.

7. The method of claim 1, further comprising selecting the user from a plurality of users of any of a plurality of systems connected to the database, the selecting of the user based on a transaction history of the user with respect to a specimen of the product.

8. The method of claim 7, wherein:
the user is at least one of a buyer and a seller of the specimen of the product; and
the transaction is at least one of a purchase or a sale of the specimen by the user.

9. The method of claim 1, further comprising:
identifying a grade of the candidate media; and
wherein the selecting of the candidate media data as the stock media data is based on the identifying.

10. The method of claim 1, wherein the receiving of the candidate media data is based on a determination that a count of further candidate media data submitted by the user does not transgress an individual user submission threshold.

11. The method of claim 1 further comprising:
calculating a percentage of accuracy with which the candidate media data corresponds to the at least some of the information about the product; and
wherein the selecting of the candidate media data as the stock media data is based on the calculating.

12. The method of claim 1, wherein:
the candidate media data is an image that depicts a specimen of the product.

13. The method of claim 1, wherein:
the candidate media data is a video that depicts a specimen of the product.

14. The method of claim 1, wherein a specimen of the product includes at least one of a physical object, electronic data, an authorization to use the electronic data, and an obligation to perform a service.

15. A system comprising:
an access module having one or more processors to access a database, the database storing a product record, the product record including information about a product;
a generator module to generate a request that a user of a system connected to the database provide candidate media data descriptive of the product, the request including at least some of the information about the product;
a transmission module to transmit the request to the user;
a reception module to receive the candidate media data;
a candidate-selection module to select the candidate media data as stock media data of the product; and
a storage module to store a reference to the stock media data in the database to associate the stock media data with the product record, the stock media data being accessible for use by one or more other users of the system.

16. The system of claim 15, further comprising a compensation module to:
calculate an amount of a reward to provide to the user in response to the selecting of the candidate media data as the stock media data; and
provide the reward to the user in response to the selecting of the candidate media data, the providing of the reward including increasing a stored value account of the user by the amount of the reward.

17. The system of claim 16, wherein the calculating of the amount of the reward is based on a profile of the user, the profile including a number of submissions of further candidate media data by the user.

18. The system of claim 15, further comprising a user-selection module to select the user from a plurality of users of any of a plurality of systems connected to the database, the selecting of the user based on a transaction record pertaining to a transaction performed by the user with respect to a specimen of the product, the transaction record being stored in the database.

19. A non-transitory machine-readable storage medium comprising instructions that, when executed by one or more processors of a machine, cause the machine to perform a method comprising:
accessing a database, the database storing a product record, the product record including information about a product;
generating a request that a user of the network-based publication system provide candidate media data descriptive of the product, the request including at least some of the information about the product;
transmitting the request to the user, the transmitting being performed by a processor;
receiving the candidate media data;
selecting the candidate media data as stock media data of the product; and
storing a reference to the stock media data in the database to associate the stock media data with the product record, the stock media data being accessible for use by one or more other users of the system.

20. The non-transitory machine-readable storage medium of claim 19, wherein the receiving of the candidate media data is based on a determination that a count of further candidate media data submitted by the user does not transgress an individual user submission threshold.

21. A method comprising:
   accessing a database, the database storing a product record, the product record including information about a product;
   generating a request that a user of a system connected to the database provide candidate media data descriptive of the product, the request including at least some of the information about the product;
   transmitting the request to the user, the transmitting being performed by a processor;
   receiving the candidate media data;
   selecting the candidate media data as stock media data of the product; and
   storing a reference to the stock media data in the database to associate the stock media data with the product record, the stock media data being accessible for use by one or more other users of the system and configured to be utilized by a seller of a specimen of the product, the seller being a different entity than the user.

* * * * *